United States Patent
Zoratti et al.

(10) Patent No.: US 6,771,210 B2
(45) Date of Patent: Aug. 3, 2004

(54) SENSOR ALIGNMENT METHOD AND SYSTEM

(75) Inventors: Paul Kirk Zoratti, South Lyon, MI (US); Jeffrey Allen Bochenek, Milford, MI (US); Joseph Charles Attard, Dearborn, MI (US); Ammon Keefe Wright, Canton, MI (US); Terry Joseph Anson, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/266,403

(22) Filed: Oct. 8, 2002

(65) Prior Publication Data

US 2004/0066325 A1 Apr. 8, 2004

(51) Int. Cl.⁷ .................................. G01S 7/40
(52) U.S. Cl. ...................... 342/165; 342/174
(58) Field of Search .......................... 342/165, 173, 342/174, 74, 75, 77, 80, 81, 82, 89, 140, 141, 146, 149

(56) References Cited

U.S. PATENT DOCUMENTS

| | | | | |
|---|---|---|---|---|
| 4,326,800 A | * | 4/1982 | Fitts ..................... | 356/139.05 |
| 6,020,844 A | | 2/2000 | Bai et al. ................... | 342/165 |
| 6,087,995 A | * | 7/2000 | Grace et al. ................ | 343/703 |
| 6,329,952 B1 | * | 12/2001 | Grace ........................ | 343/703 |
| 6,335,705 B1 | * | 1/2002 | Grace et al. ................ | 343/703 |
| 6,363,619 B1 | | 4/2002 | Schirmer et al. ............ | 33/288 |
| 6,437,731 B1 | * | 8/2002 | Henrio et al. .............. | 342/165 |
| 6,556,166 B1 | * | 4/2003 | Searcy et al. .............. | 342/165 |
| 2003/0090411 A1 | * | 5/2003 | Haney et al. ............... | 342/165 |

FOREIGN PATENT DOCUMENTS

| | | |
|---|---|---|
| DE | 19857871 C1 * | 10/2000 |
| DE | 19936609 | 3/2001 |
| EP | 1111714 | 9/2003 |
| GB | 2375671 | 11/2002 |
| WO | 0111387 | 2/2001 |
| WO | 0157551 | 8/2001 |

* cited by examiner

*Primary Examiner*—John B. Sotomayor
(74) *Attorney, Agent, or Firm*—John Kajander, Esq.

(57) ABSTRACT

A method of aligning a sensor device attached to an automobile includes the steps of positioning a first detection object relative to the automobile and generating a plurality of beams at the sensor device. A beam crossing point common to first and second adjacent beams is selected, and the sensor alignment is verified by determining whether the beam crossing point is coincident with the first detection object.

38 Claims, 9 Drawing Sheets

SENSOR ALIGNMENT METHOD AND SYSTEM

BACKGROUND

1. Field of the Invention

The present invention relates to sensor alignment methods and systems, and more particularly to a radar alignment and verification method and system for aligning or verifying the alignment of a radar antenna array attached to an automobile.

2. Description of the Related Art

Sensors, such as radar antenna arrays, are used on automobiles to provide drivers with features such as blind-spot detection, parking aids, adaptive cruise control, pre-crash sensing, and the like. The sensors are attached at various locations on the automobile and generate a plurality of directional beams that provide information regarding objects located in the vicinity of the automobile.

The beams of a sensor must be radiated at a predetermined azimuthal angle to provide accurate information. Furthermore, depending on the beam pattern of the sensor, a predetermined elevation angle may also be required. Accordingly, the sensor is usually installed on a mounting bracket that facilitates azimuthal angle and elevation angle adjustment. During installation of the sensor, the sensor alignment must be verified. Furthermore, at certain times during the life of the automobile, such as a scheduled maintenance routine, the sensor alignment must again be verified. Additionally, if the sensor is out of alignment, the sensor must be adjusted and brought back into alignment.

SUMMARY

A novel method of aligning a sensor device attached to an automobile comprises the steps of positioning a first detection object relative to the automobile and generating a plurality of beams at the sensor device. A beam crossing point common to first and second adjacent beams is selected, and the sensor alignment is verified by determining whether the beam crossing point is coincident with the first detection object.

Another novel method of aligning a sensor device attached to an automobile comprises the steps of defining a sensor axis and positioning first and second detection objects relative to the automobile. The first detection object is coincident with the sensor axis, and the second detection object is vertically displaced from the sensor axis. A plurality of beams is generated, and first and second signal levels are determined in first and second beams, respectively. The first signal level corresponds to the first detection object, and the second signal level corresponds to the second detection object. Sensor alignment is determined based on the first and second signal levels.

A novel system for aligning a sensor device attached to an assembly comprises a first positioning fixture operable to place the assembly in a first location, and a second positioning fixture operable to place a first detection object in a second location. The second location is relative to the assembly such that the first detection object is positioned at a beam crossing point of first and second adjacent beams when the sensor device is aligned.

DETAILED DESCRIPTION

Figure 1:
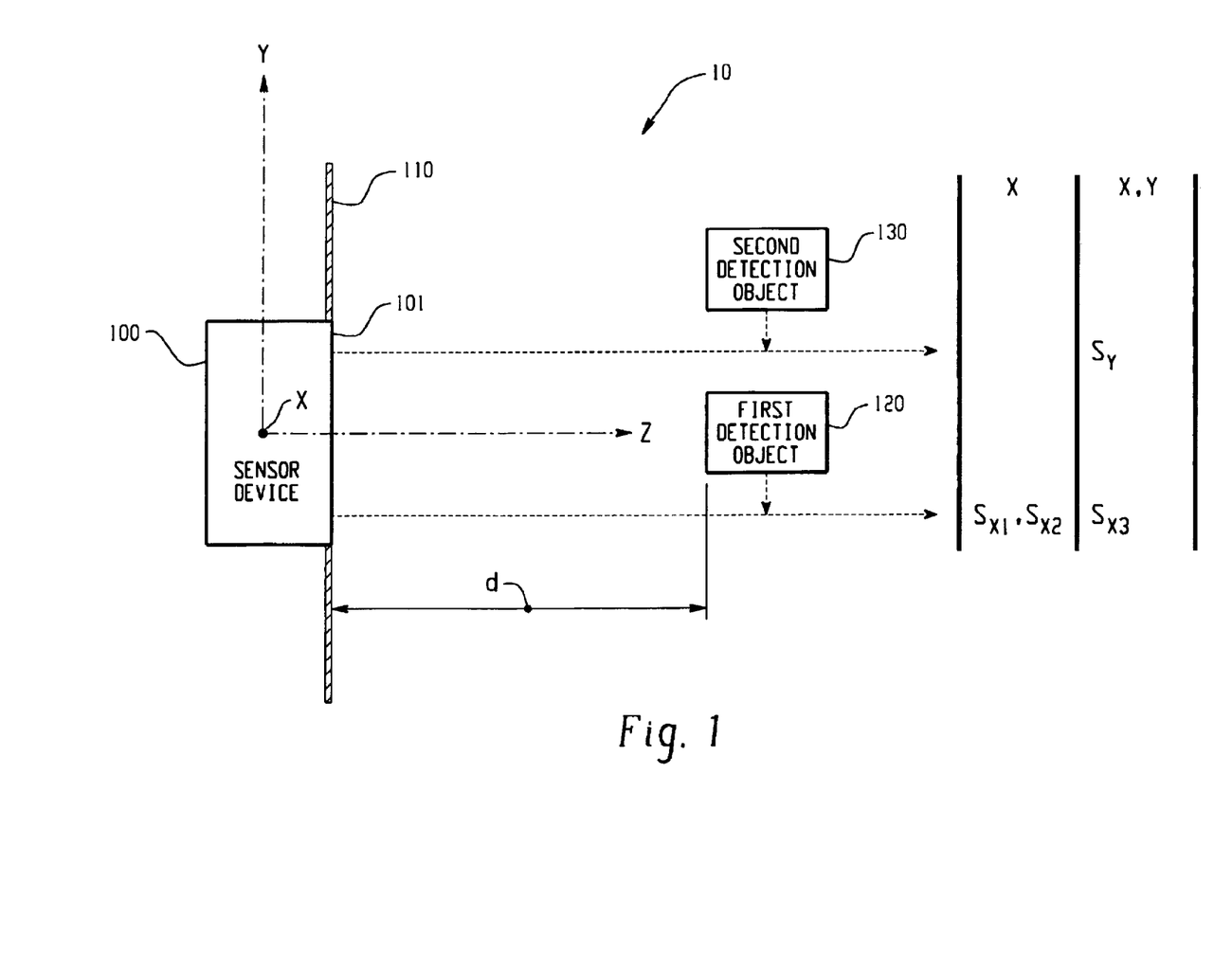
FIG. 1 is a block diagram of a sensor alignment system.

FIG. 1 provides a block diagram of a sensor alignment system 10. A sensor device 100 is attached to an assembly 110. The sensor device 100 performs spatial detection by radiating from a radiation surface 101 a beam pattern comprising a plurality of directional beams. Exemplary sensor devices 100 include radar antenna array, acoustical arrays, and the like.

The beams of the sensor device 100 must be radiated at a predetermined azimuthal angle to provide accurate information about detected objects. Thus, the sensor device 100 is aligned with respect to at least a first sensor axis x. Furthermore, depending on the beam pattern of the sensor device 100, a predetermined elevation angle may also be required. Therefore, the sensor device may be further aligned with respect to a second sensor axis y, or even a third sensor axis z.

In one embodiment, the system 10 verifies the proper alignment of the sensor device 100 according to the first sensor axis x. A first detection object 120 is placed relative to the assembly 110. The sensor device 100 generates a first set of detection signals $S_{x1}$ and $S_{x2}$ corresponding to the first detection object 120. The first set of detection signals $S_{x1}$ and $S_x$ are used to determine whether a beam crossing point for two adjacent beams is aligned with the first detection object 120. Thus, based on the first set of detection signals, sensor alignment with respect to the first axis x can be determined.

In another embodiment, the system 10 verifies the proper alignment of the sensor device 100 according to the first sensor axis x and a second sensor axis y. A second detection object 130 is placed relative to the assembly 110 in addition to the first detection object 120. The sensor device 100 generates a first detection signal $S_{x3}$ corresponding to the first detection object 120, and a second detection signal $S_y$ corresponding to the second detection object 130. Based on the first and second detection signals $S_{x3}$ and $S_y$, sensor alignment with respect to both the first axis x and the second axis y can be determined. The first detection signal $S_{x3}$ may be one of the detection signals $S_{x1}$ or $S_{x2}$.

In another embodiment, the first and second detection objects 120 and 130 are preferably placed a distance d from the radiation surface 101 of the sensor device 100 such that the sensor device 100 is not in the near field of the detection objects 120 and 130. Similarly, the first and second detection objects 120 and 130 are also not within the near field of the sensor device 100.

Figure 2:
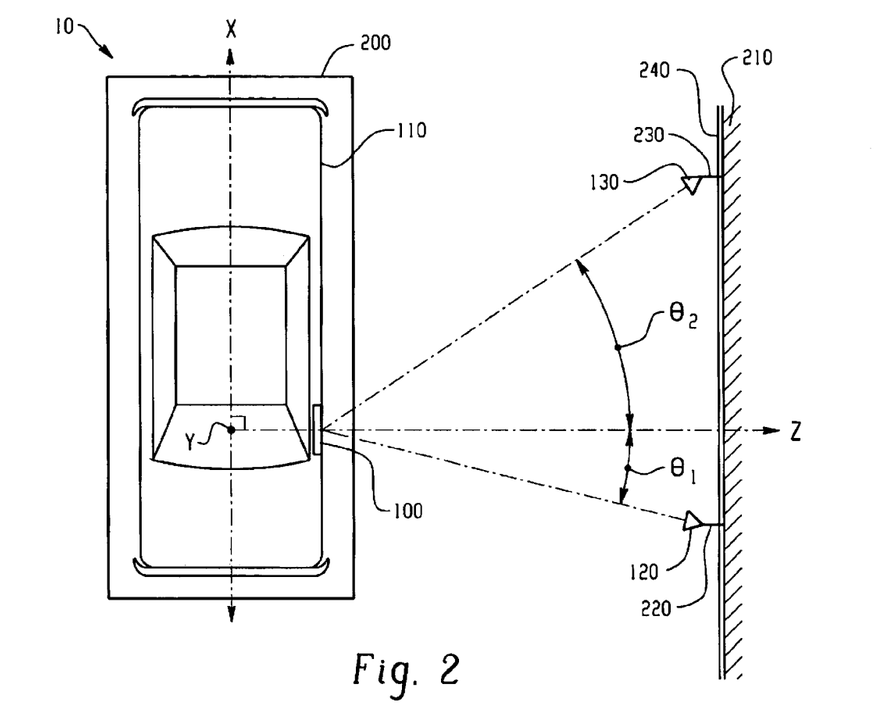
FIGS. 2, 3 and 4 provide top, forward and side views of the sensor alignment system.
Figure 3:
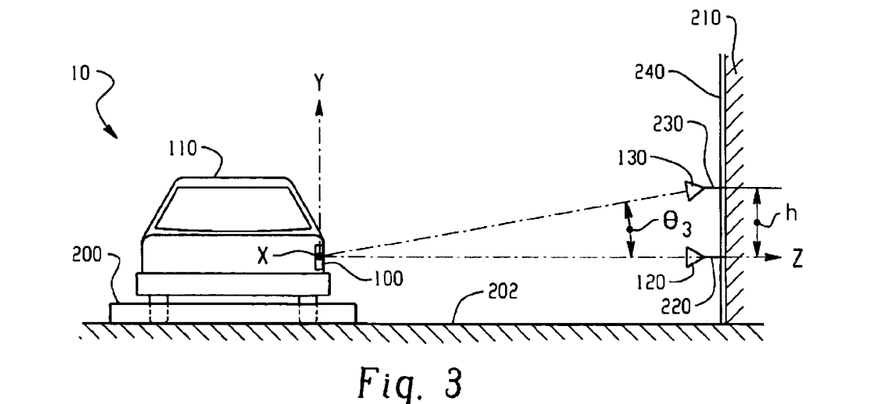
Figure 4:
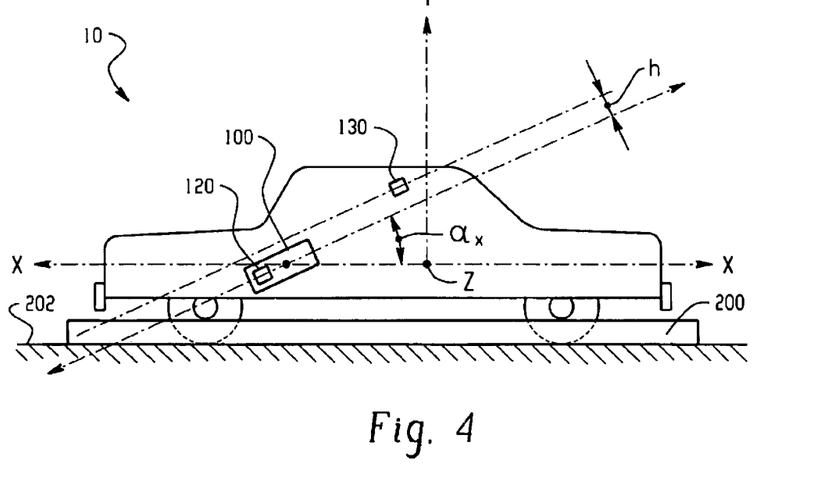

FIGS. 2, 3 and 4 provide top, forward and side views of the sensor alignment system 10. The illustrative embodiments shown in FIGS. 2–4 are used for alignment verification and adjustment of sensor devices 100 attached to an automobile assembly 110. First and second detection objects 120 and 130 are placed relative to the automobile 110. The first detection object 120 is placed at an angle $\theta_1$ from an aligned center bore site of the sensor device 100. The second detection object is placed at an angle $\theta_2$ from the aligned center bore site of the sensor device 100. Furthermore, the second detection object 130 is also placed at an angle $\theta_3$ above the sensor axis x, such that the second detection object 130 is vertically displaced a distance h above the first detection object 120, as shown in FIG. 3. The values of $\theta_1$, $\theta_2$, and $\theta_3$ depend on the beam pattern of the sensor device 100.

The automobile 110 is placed in a positioning fixture 200 so that the attached sensor 100 and the first and second detection objects 120 and 130 are displaced from each other as described above and shown in FIGS. 2 and 3. The positioning fixture 200 may be a vehicle mount device operable to receive the automobile 110 so that the automobile 110 is in a fixed position. Alternatively, the positioning fixture may be a visual indication system for verifying that that automobile 100 is in the fixed position. Such visual indication systems include painted indicators on a surface 202, laser reference points for laser beams emitted from lasers attached to the automobile 110, and the like.

The first and second detection objects 120 and 130 are mounted to a wall 210 via mounts 220 and 230, respectively. The wall 210 may also be lined with an energy absorbing material 240. The choice of the energy absorbing material 240 is dependent on the particular type of sensor device 100 used. For example, if the sensor device 100 is a radar antenna array, then the energy absorbing material 240 is a radar absorbing material; if the sensor device 100 is an acoustical array, then the energy absorbing material 240 is an acoustic absorbing material.

The position of a properly aligned sensor device 100 will depend on the location and function of the sensor device 100. For example, a blind spot detection sensor is placed near the blind spot of the automobile and positioned for spatial detection of the blind spot; a collision avoidance sensor is placed at the front of the automobile and positioned for spatial detection of an area in front of the automobile. Thus, the sensor device 100 may require angular rotation about the x, y and z-axes for proper alignment. For example, the sensor device 100 as depicted in FIGS. 2 and 3 is properly aligned when there is no angular rotation in either the x, y or z axes. However, the system 10 will also verify alignment of sensor devices 100 having an alignment requiring an angular offset in one or even all of the x, y and z axes. In FIG. 4, for example, the sensor device 100 is to be aligned with an angular rotation of $\alpha_x$ about the x-axis. The positions of the first and second detection devices 120 and 130 are rotated accordingly.

Figure 5:
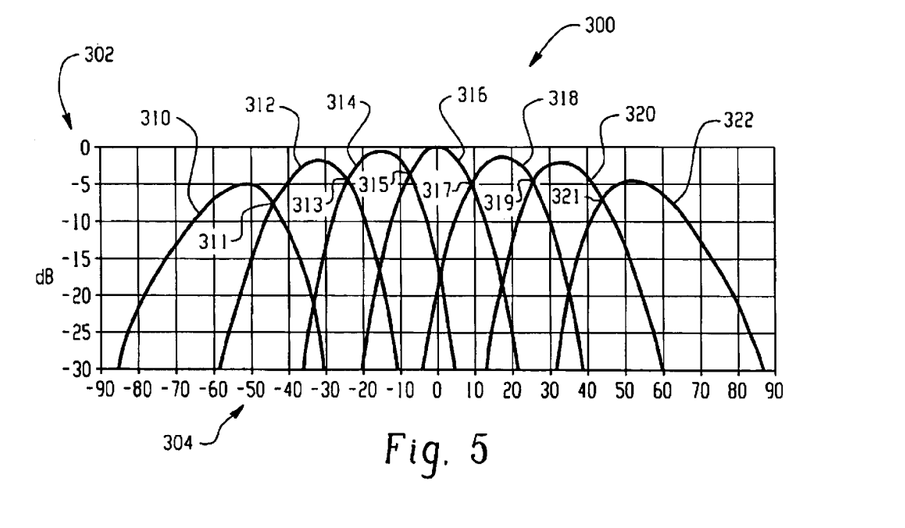
FIG. 5 illustrates a two-dimensional azimuthal beam pattern of a sensor device.

Positioning of the first and second detection objects 120 and 130 depends on the beam pattern generated by the sensor device 100. FIG. 5 illustrates one such two-dimensional azimuthal beam pattern 300 generated by the sensor device 100. The beam pattern 300 is radiated from the radiation surface 101 of the sensor device 100. The beam pattern is measured on a referenced power dB scale 302 over an azimuthal angular axis 304 and comprises a plurality of beams 310, 312, 314, 316, 318, 320 and 322. Each beam has an associated bore site at which its receive response is at a maximum. For example, beam 316, the center beam of the beam pattern 300, has a bore site of 0°, which coincides with the z-axis.

The beams 310, 312, 314, 316, 318, 320 and 322 may be generated simultaneously, or may be generated by sweeping one beam in discrete steps for each bore site, or by mechanically steering the sensor device 100. For example, in one embodiment, the sensor device 100 is a radar array, and the beam pattern 300 is generated by simultaneously generating a plurality of beams by selecting predefined antenna apertures in the sensor device 100. In another embodiment, the beam pattern 300 is generated by constantly adjusting phase delays associated with the antenna array and thereby selectively steering one single beam to each beam position in the beam pattern 300. A signal level measurement is taken at each beam position. In yet another embodiment, the beam pattern 300 is generated by mechanically steering the sensor device 100. In this embodiment, the sensor device 100 generates a directional beam and is mounted on a mechanically adjustable device, such as an electronically controlled gimbal mount. The sensor device 100 is steered so the directional beam is positioned at corresponding bore sites, and a signal measurement is taken at each beam position. Other methods of generating the beam pattern 300 may also be utilized.

Each pair of adjacent beams has a beam crossing point, which is the first intersection point between two adjacent beams. For example, beams 316 and 318 have a beam crossing point 317. An object located at a beam crossing point will thus cause an equal power signal in each beam that defines the beam crossing point.

A beam width for each beam is the angular measurement between two beam crossing points. For example, beam crossing point 315 is located at −8°, and beam crossing point 317 is located at 9°. Thus, the beam width of beam 316 is 17°.

Figure 6:
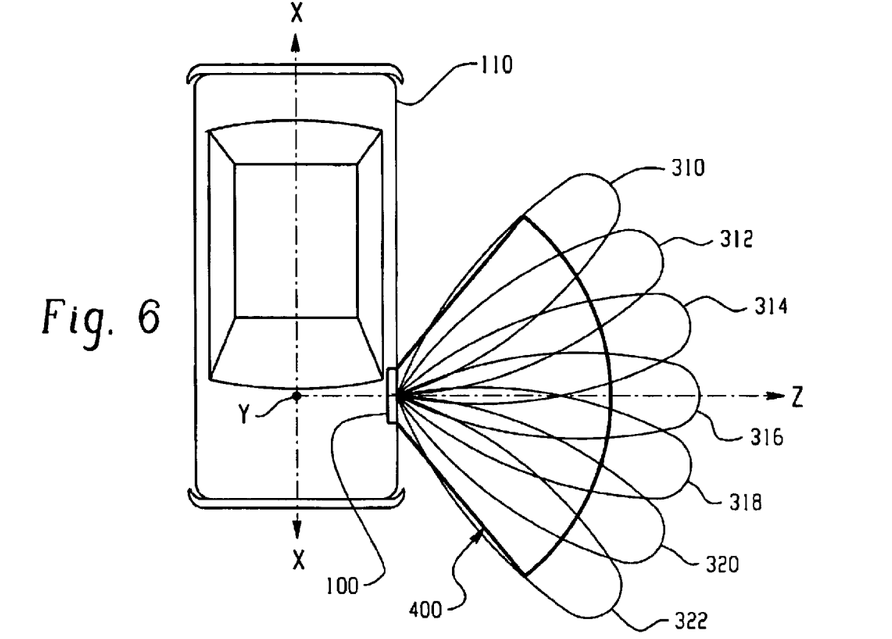
FIG. 6 is a top view of the beam pattern coverage of a detection zone for a properly aligned sensor device.

FIG. 6 is a top view of the beam pattern coverage of a detection zone 400 for a properly aligned sensor device 100. The detection zone 400 shown is configured to coincide with the passenger side blind spot of the automobile 110. The sensor device 100 generates the beams 310, 312, 314, 316, 318, 320 and 322 to provide detection of objects in the blind spot.

Figure 7:
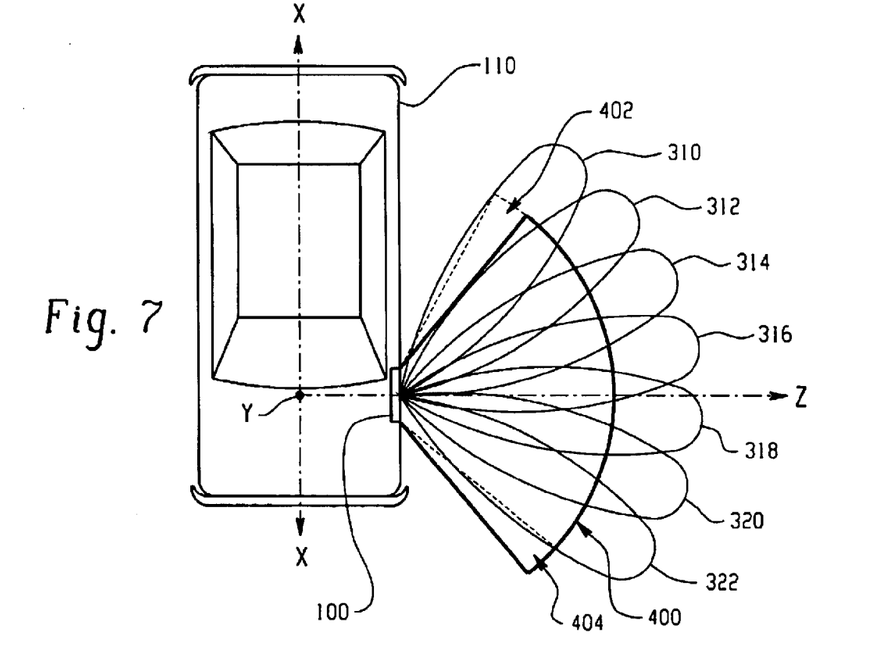
FIG. 7 is a top view of the beam pattern coverage of the detection zone for a misaligned sensor device.

FIG. 7 is a top view of the beam pattern coverage of a detection zone 400 for a misaligned sensor device 100. The sensor device 100 is azimuthally misaligned by approximately 10°, and thus the beams 310, 312, 314, 316, 318, 320 and 322 are similarly misaligned. Therefore, objects in zone 402, which are outside of the detection zone 400, will cause the sensor device 100 to indicate a false detection of an object in the detection zone 400. Likewise, objects in zone 404, which are within the detection zone 400, will not be detected by the sensor device 100, and thus the sensor device 100 will falsely indicate that the detection zone 400 is clear.

Figure 8:
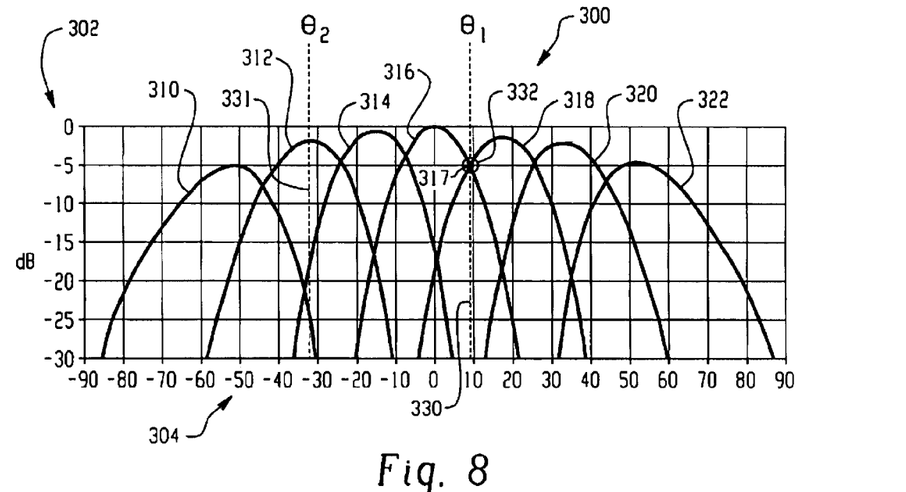
FIG. 8 illustrates a beam crossing point coincident with a first detection object for a properly aligned sensor device.

The alignment verification of the sensor device 100 by the system 10 of FIGS. 1–4 is further described with reference to FIGS. 8 and 9. FIG. 8 illustrates a beam crossing point 317 coincident with a first detection object 120 for a sensor device having proper azimuthal alignment. As indicated by line 330, the first detection object is placed at the angle $\theta_1$ from an aligned bore site of one of the plurality of beams 310, 312, 314, 316, 318, 320 and 322. Likewise, as indicated by line 331, the second detection object is placed at an angle $\theta_2$ from an aligned bore site of one of the plurality of beams 310, 312, 314, 316, 318, 320 and 322. In the illustrative embodiment described, the aligned bore site corresponds to the bore site of the beam 316 for a properly aligned sensor device 100, which is 0°. Furthermore, the angle $\theta_1$ corresponds to the beam crossing point 317 for a properly aligned sensor device 100. For the illustrative beam pattern 300, $\theta_1$ is 9°.

Each beam 316 and 318 that defines the beam crossing point 317 will produce a signal corresponding to the first detection object 120 located at the beam crossing point 317. A difference in a first signal level of the beam 316 and a second signal level of the beam 318 indicates a sensor misalignment. In one embodiment, the difference of the first and second signal levels is measured by a ratio of the signal of beam 316 to the signal of the beam 318. In another embodiment, the difference of the first and second signal levels is measured by subtracting the signal of beam 316 from the signal of the beam 318. The system 10 can be configured to correlate the signal level difference to an angular misalignment value, or may be configured to indicate a sensor misalignment if the signal level difference exceeds a threshold value (e.g., 0.5 dB).

As indicated by the intersection point 332, the first detection object is at the beam crossing point 317 of the beams 316 and 318. Thus, the first and second signal levels from the beams 316 and 318 are −5 dB, and the system 10 will therefore indicate that the sensor device 100 is in proper azimuthal alignment.

Figure 9:
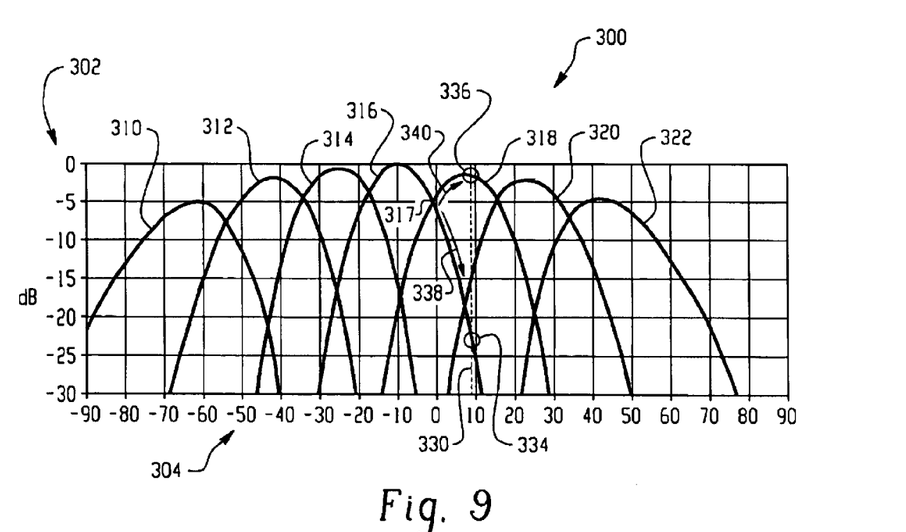
FIG. 9 illustrates the beam crossing point shifted from the first detection object for a misaligned sensor device.

FIG. 9 illustrates the beam crossing point 317 shifted from the first detection object 120 for an azimuthally misaligned sensor device 100. In FIG. 9, the sensor device 100 is azimuthally misaligned by 10°, as indicated by the bore site of beam 316 having been shifted to −10°. The first signal level of the beam 316 corresponding to the first detection object is approximately −23 dB, as indicated by the intersection point 334, and the second signal level of the beam 318 is now approximately −2 dB, and indicated by the intersection point 336. Accordingly, the first and second signal levels differ by 21 dB, thus indicating misalignment of the sensor device 100.

By using a beam crossing point to measure the sensor device 100 alignment, only one detection object is required to verify proper azimuthal alignment. Furthermore, small azimuthal misalignments can be detected. As the beam crossing point 317 shifts from coincidence with the first detection object 120, the difference in the first and second signal levels will increase rapidly. For example, as the beam pattern of FIG. 8 is shifted in the negative direction down the angular axis 304, the first signal level corresponding to the first detection object in the beam 316 will decrease rapidly, as indicated by arrow 338 of FIG. 9. Conversely, the second signal level corresponding to the first detection object in the beam 318 will increase less rapidly, reach a maximum at the bore site of the beam 318, and will then begin to decrease, as indicated by arrow 340. Depending on the beam width of the beams generated by the sensor array, signal differences of 0.5 dB between the first and second signal level can be correlated to azimuthal misalignments as small as 0.3°.

Additionally, while first detection object 120 of the embodiment described has been placed an angle of $\theta_1$ from the center bore site of the sensor device 100 corresponding to the beam crossing point 317 of the center beam 316 and an adjacent beam 318, other beam crossing points may be used. For example, if the beam crossing point 319 is used, the value of $\theta_1$ is 26°, as this is the angle at which the beam crossing point 319 is located when the sensor device is properly aligned.

Also, the embodiment thus described may be used to verify elevation angle alignment in addition to azimuthal angle alignment. If the sensor device 100 generates multiple, spatially-dispersed beams in the elevation dimension in additional to the azimuthal dimension, the same embodiment may also be used to detect elevation angle misalignments of the sensor device 100 by choosing a beam crossing point of two adjacent elevation beams. Elevation angle misalignments may be caused by mounting the sensor device 100 too high or too low, or by incorrectly rotating the sensor device 100, thus causing a rotational displacement of the beam pattern 300.

Figure 10:
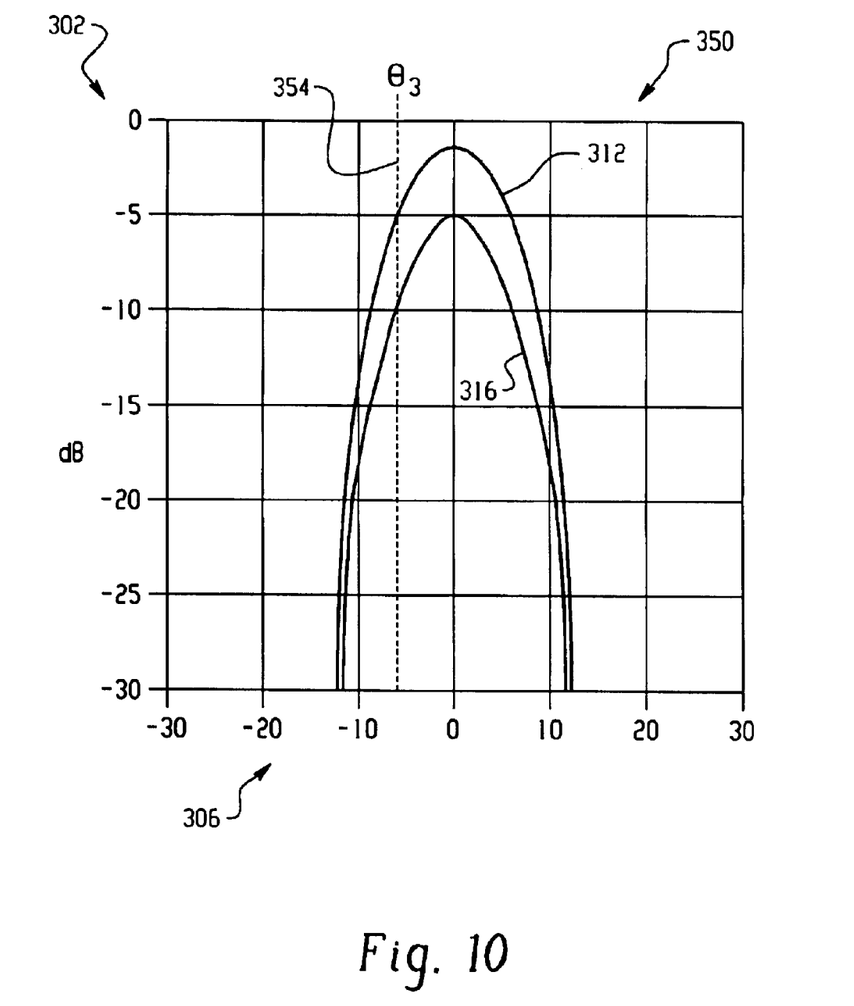
FIG. 10 illustrates an elevation beam pattern for two beams of the sensor device.

Another embodiment of the system 10 may be used to verify elevation angle alignment and azimuthal angle alignment of the sensor device independent of elevation beams. The second detection object 130 is positioned relative to the automobile and displaced from the first detection object 120 as shown in FIGS. 2 and 3. In this embodiment, both azimuthal angle and elevation angle alignment are verified according to an elevation characteristic of the single azimuthal beam pattern 300 of FIG. 5 and as described in further detail in FIG. 10, which illustrates an elevation beam pattern 350 for two beams 312 and 316 of the sensor device 100. As in FIG. 5, the beam pattern 350 of FIG. 10 is measured on a referenced power dB scale 302. However, in FIG. 10, the dB scale 302 is distributed over an elevation angular axis 306. The elevation slice of beam 316 corresponds to the beam response at the beam crossing point 317, which is $\theta_1$ degrees off the azimuthal bore site of the beam 312. The elevation slice of beam 312 corresponds to the beam response at the azimuthal bore-site of beam 312, which is $\theta_2$ degrees off the azimuthal bore site of the beam 316. For the illustrative beam pattern 300, $\theta_2$ is 33°. Another line 354 corresponds to the second detection object 130 that is positioned $\theta_3$ degrees above the sensor device 100 axis x. For the illustrative beam pattern 350, $\theta_3$ is 5°.

Figure 11:
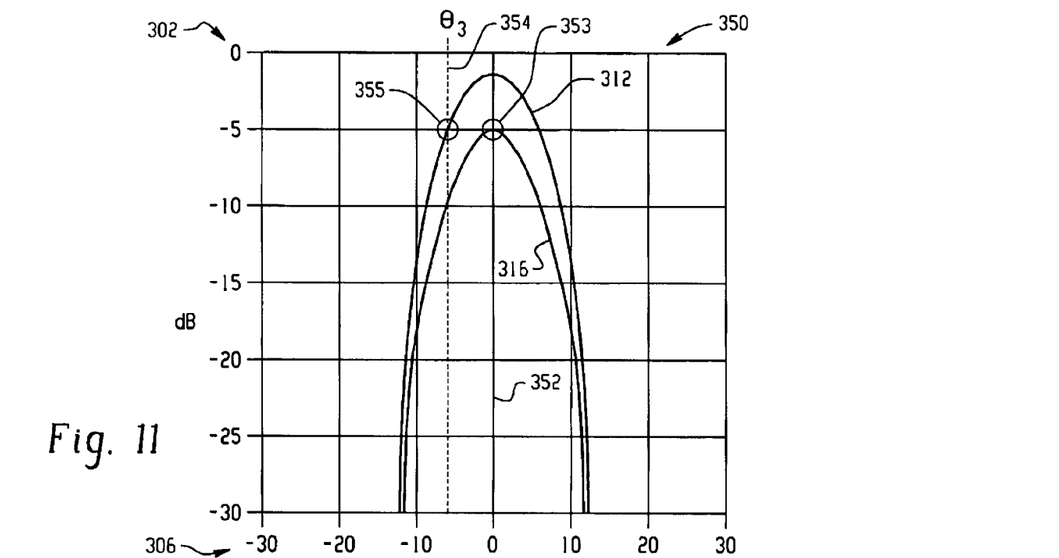
FIG. 11 illustrates the elevation beam pattern signal levels corresponding to a first detection object and a second detection object for a properly aligned sensor.

FIG. 11 illustrates the elevation beam pattern signal levels corresponding to the first and second detection objects 120 and 130 for a properly aligned sensor 100. A line 352 corresponds to the first detection device 120 that is positioned coincident with the plane defined by the sensor device 100 axes x and z. The intersection point 353 indicates a first signal having a magnitude of −5 dB and corresponding to detection in the beam 316 of the first detection object 120 level.

The intersection point 355 indicates a second signal having a level of −5 dB and corresponding to detection in the beam 312 of the second detection object 130. A difference in the first signal of the beam 316 and the second signal of beam 312 will indicate a sensor misalignment. As the first and second signal levels from the beams 316 and 312 are the same at −5 dB, the system 10 will indicate that the sensor device is properly aligned for both azimuthal and elevation angles.

Figure 12:
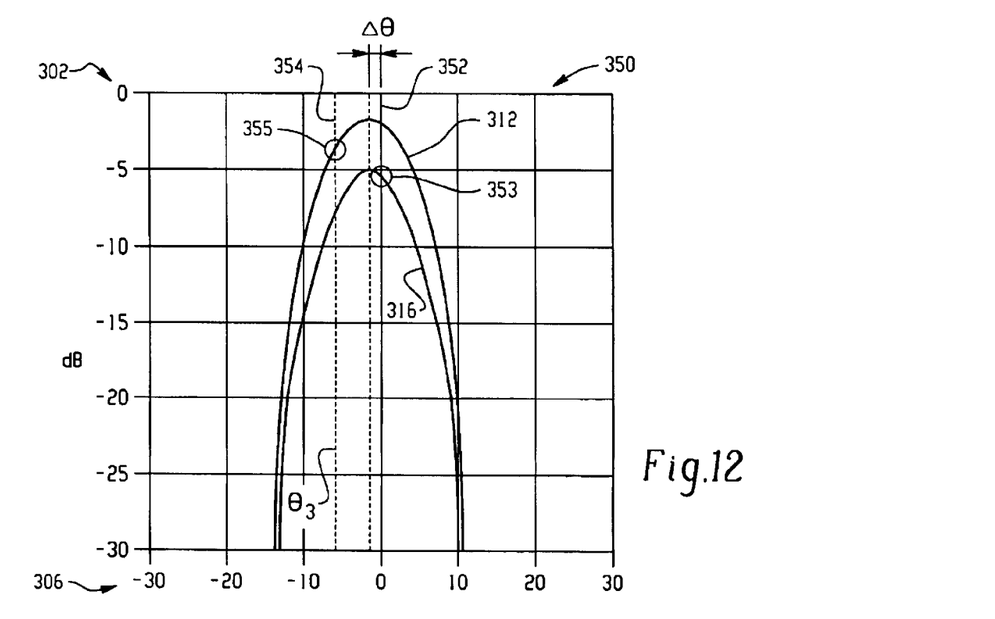
FIG. 12 illustrates the elevation beam pattern signal levels corresponding to the first and second detection objects for a misaligned sensor.

FIG. 12 illustrates the elevation beam pattern signal levels corresponding to the first and second detection objects 120 and 130 for a misaligned sensor 100. In this example, the sensor device 100 is misaligned by an elevation angle of $\Delta\theta$, which is approximately 1°. Intersection points 353 and 355 now indicate first and second signal levels of approximately −6 dB and −4 dB, respectively, which in turn indicate an elevation angle misalignment of the sensor device 100. Thus, by using two detection objects 120 and 130, the system 10 can verify both the azimuthal angle and elevation angle alignment of the sensor device 100.

While the second detection object 130 of the embodiment described has been vertically displaced above the first detection object 120, the second detection object may also be vertically displaced below the first detection object 120. Furthermore, angles $\theta_1$, $\theta_2$, and $\theta_3$ may likewise be changed accordingly, depending on the particular beam pattern of the sensor 100.

If the sensor device 100 is misaligned, then the system 10 can further be used to align the sensor device 100. The sensor device 100 can be adjusted manually or electronically until the system 10 indicates that the sensor device 100 is aligned. Manual adjustment can be accomplished by physically adjusting the sensor device 100 in a corresponding mounting bracket attached to the automobile 110, or by other similar methods. Electronic adjustment can be accomplished by inputting steering parameter or time delays into the sensor device 100 that cause the sensor device 100 to steer the beam pattern 300 at an azimuthal angle and/or an elevation angle. Other electronic adjustments can also be utilized. Once the system 10 indicates that the sensor device 100 is properly aligned, no further adjustments are needed.

Figure 13:
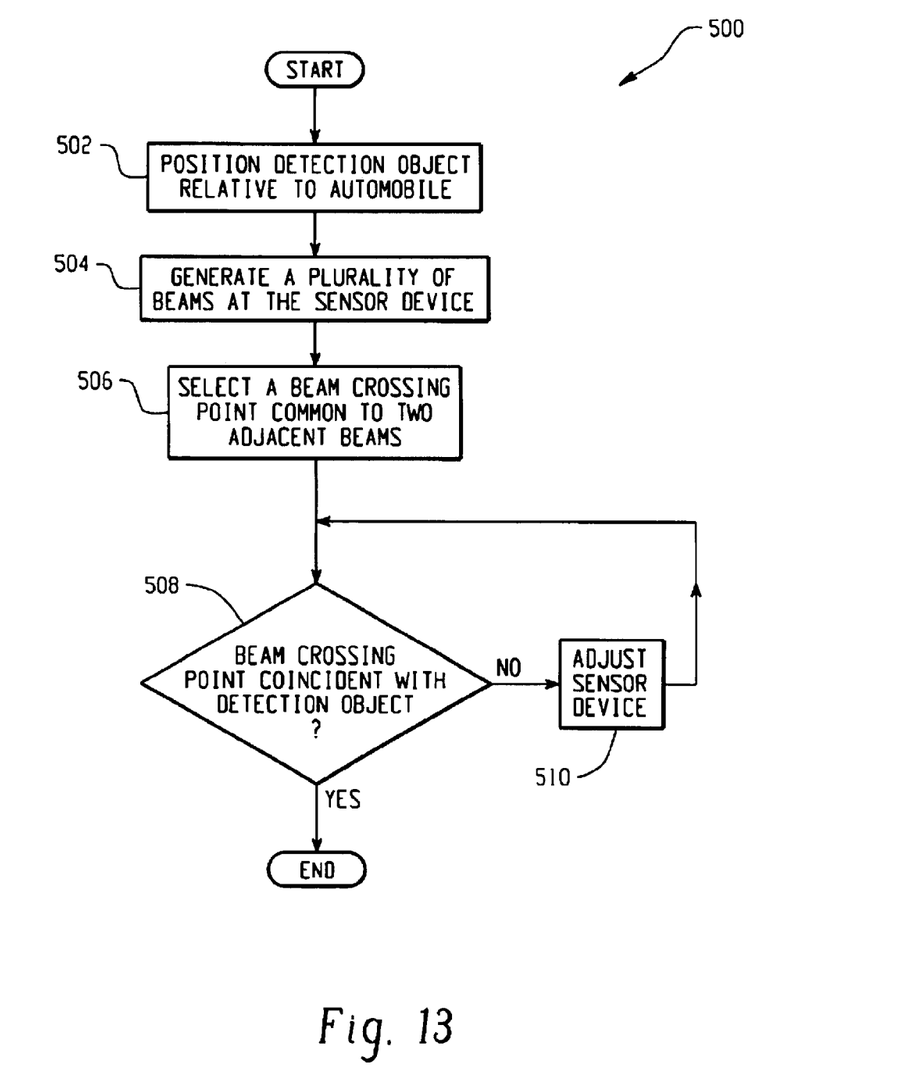
FIG. 13 is a flow diagram illustrating a process of verifying and correcting the azimuthal angle alignment of the sensor device.

FIG. 13 is a flow diagram 500 illustrating the process of verifying and correcting azimuthal alignment of the sensor device 100. In step 502, a first detection object 120 is positioned relative to the automobile 110. In step 504, the sensor device 100 generates a plurality of beams. In step 506, a beam crossing point common to two adjacent beams is selected. Step 508 determines if the beam crossing point is coincident with the first detection object 120. If the beam crossing point is coincident with the first detection object 120, then the sensor device 100 is azimuthally aligned. However, if the beam crossing point is not coincident with the first detection object 120, then the sensor device is azimuthally misaligned. The sensor device 100 is then adjusted, as shown in step 510, and step 508 is repeated.

Figure 14:
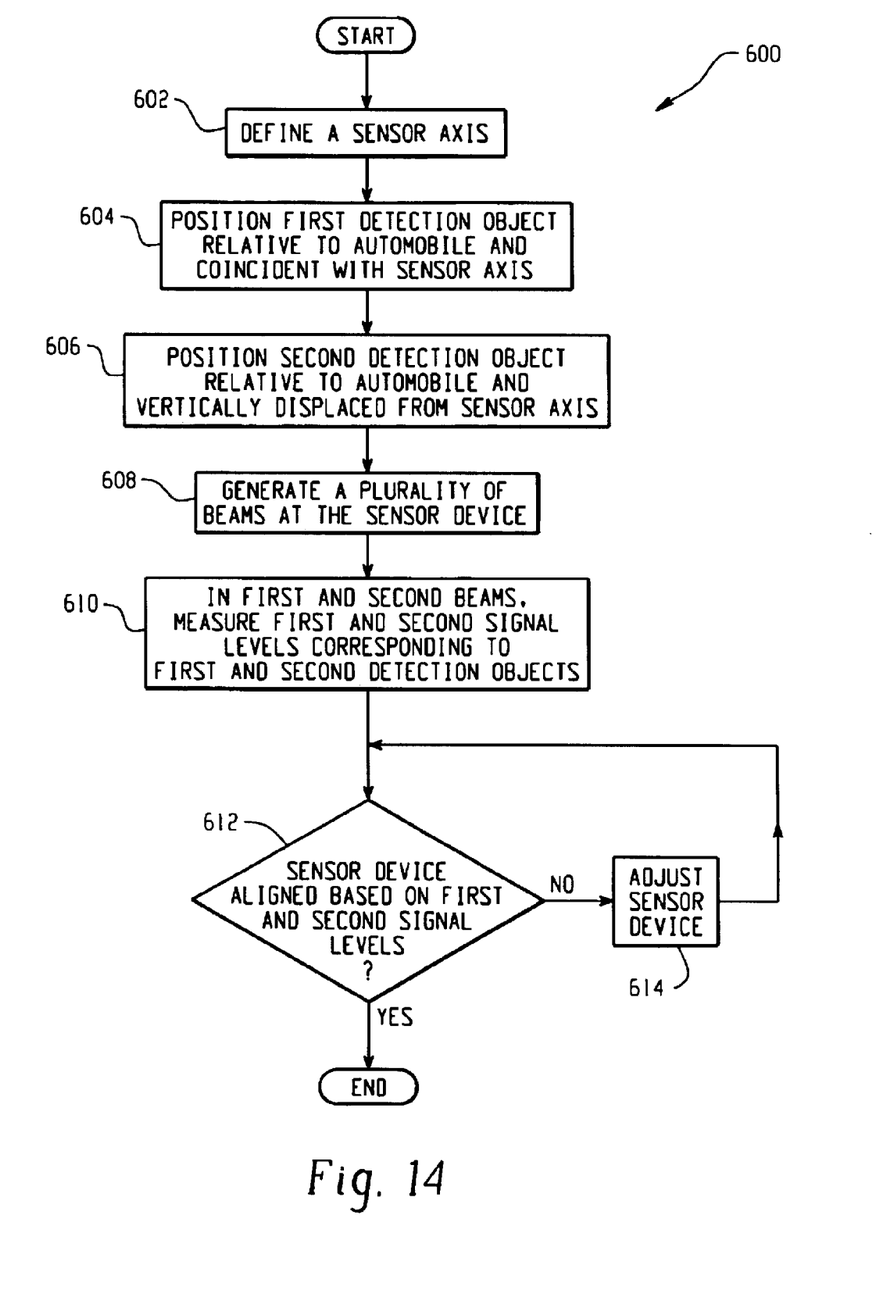
FIG. 14 is a flow diagram illustrating a process of verifying and correcting the azimuthal angle and the elevation angle alignment of the sensor device.

FIG. 14 is a flow diagram 600 illustrating a process of verifying and correcting azimuthal and elevation alignment of the sensor device 100. In step 602, a sensor axis is defined. In step 604, a first detection object 120 is positioned relative to the automobile 110 and coincident with the sensor axis. In step 606, a second detection object 130 is positioned relative to the automobile and vertically displaced from the sensor axis. In step 608, the sensor device 100 generates a plurality of beams. In step 610, first and second signal levels corresponding to the detection of the first and second detection objects in first and second beams are measured. Step 612 determines if the sensor device 100 is in azimuthal and elevation alignment based on the first and second signal levels. If the sensor device 100 is not properly aligned, then the sensor device 100 is adjusted in step 614, and step 612 is repeated.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

What is claimed is:

1. A method of aligning a sensor device attached to an automobile, the method comprising the steps of:
   positioning a first detection object relative to the automobile;
   generating a plurality of beams at the sensor device;
   selecting a beam crossing point common to a pair of first and second adjacent beams; and
   determining whether the beam crossing point is coincident with the first detection object.

2. The method of claim 1, further comprising the step of adjusting the sensor device to shift the plurality of beams until the beam crossing point is coincident with the first detection object.

3. The method of claim 2, wherein the step of positioning a first detection object relative to the automobile comprises the steps of:
   determining an aligned bore site of one of the plurality of beams; and
   positioning the first detection object relative to the aligned bore site.

4. The method of claim 3, wherein the step of adjusting the sensor device to shift the plurality of beams until the beam crossing point is coincident with the first detection object comprises the steps of:
   incrementally steering the plurality of beams; and
   determining after each increment whether the beam crossing point is coincident with the first detection object.

5. The method of claim 4, wherein the step of determining after each increment whether the beam crossing point is coincident with the first detection object comprises the steps of:
   determining a first signal level in the first beam, the first signal level corresponding to the first detection object; and
   determining a second signal level in the second beam, the second signal level corresponding to the first detection object.

6. The method of claim 5, wherein the step of determining after each increment whether the beam crossing point is coincident with the first detection object further comprises the steps of:
   determining the difference between the first signal level and the second signal level; and
   determining that the beam crossing point is coincident with the first detection object when the difference between the first signal level and the second signal level is less than a first threshold value.

7. The method of claim 5, wherein the step of determining after each increment whether the beam crossing point is coincident with the first detection object further comprises the steps of:
   determining a power ratio of the first signal level to the second signal level; and
   determining that the beam crossing point is coincident with the first detection object when the power ratio of the first signal level to the second signal level is less than a first threshold value.

8. The method of claim 6, wherein the step of incrementally steering the plurality of beams comprises the step of electronically steering the plurality of beams.

9. The method of claim 6, wherein the step of incrementally steering the plurality of beams comprises the step of manually steering the plurality of beams.

10. The method of claim 6, wherein the first beam is a center beam of the plurality of beams.

11. The method of claim 5, further comprising the steps of:
 defining a sensor axis; and
 positioning the first detection object coincident with the sensor axis.

12. The method of claim 11, further comprising the steps of:
 positioning a second detection object relative to the automobile and vertically displaced from the sensor axis; and
 determining a third signal level in a third beam, the third signal level corresponding to the second detection object.

13. The method of claim 12, further comprising the steps of:
 determining the difference between the first signal level and the third signal level; and
 determining the sensor device is in elevation alignment when the difference between the first signal level and the third signal level is less than a first threshold value.

14. The method of claim 13, further comprising the steps of:
 determining the difference between the first signal level and the second signal level; and
 determining that the beam crossing point is coincident with the first detection object when the difference between the first signal level and the second signal level is less than a second threshold value.

15. The method of claim 12, further comprising the steps of:
 determining the difference between the second signal level and the third signal level; and
 determining that the sensor device is in elevation alignment when the difference between the second signal level and the third signal level is less than a first threshold value.

16. The method of claim 1, wherein the sensor device is a radar antenna array.

17. The method of claim 16, wherein the first detection object is a radar reflector.

18. The method of claim 17, further comprising the step of placing a radar absorbing material behind the radar reflector.

19. The method of claim 1, wherein the step of determining whether the beam crossing point is coincident with the first detection object comprises the steps of:
 determining a first signal level in the first beam, the first signal level corresponding to the first detection object; and
 determining a second signal level in the second beam, the second signal level corresponding to the first detection object.

20. The method of claim 19, wherein the step of determining whether the beam crossing point is coincident with the first detection object further comprises the steps of:
 determining a power ratio of the first signal level to the second signal level; and
 determining that the beam crossing point is coincident with the first detection object when the power ratio of the first signal level to the second signal level is less than a first threshold value.

21. The system of claim 19, wherein the step of generating a plurality of beams at the sensor device comprises the step of simultaneously generating a plurality of beams to form a beam pattern.

22. The system of claim 19, wherein the step of generating a plurality of beams at the sensor device comprises the steps of:
 selecting a set of phase delays for a corresponding beam of the beam pattern to be generated; and
 generating the corresponding beam based on the phase delays.

23. The system of claim 19, wherein the step of generating a plurality of beams at the sensor device comprises the step of mechanically steering the sensor device across a plurality of bore sites.

24. A method of aligning a sensor device attached to an automobile, the method comprising the steps of:
 defining a sensor axis;
 positioning a first detection object relative to the automobile and coincident with the sensor axis;
 positioning a second detection object relative to the automobile and vertically displaced from the sensor axis;
 generating a plurality of beams at the sensor device;
 determining a first signal level in a first beam, the first signal level corresponding to the first detection object;
 determining a second signal level in a second beam, the second signal level corresponding to the second detection object; and
 determining whether the sensor device is aligned based on the first and second signal levels.

25. The method of claim 24, further comprising the step of adjusting the sensor device to shift the plurality of beams into alignment based on the first and second signal levels.

26. The method of claim 24, wherein the step of determining whether the sensor device is aligned based on the first and second signal levels comprises the steps of:
 determining the difference between the first signal level and the second signal level; and
 determining that the sensor is aligned when the difference between the first signal level and the second signal level is less than a threshold value.

27. The method of claim 24, wherein the step of determining whether the sensor device is aligned based on the first and second signal levels comprises the steps of:
 determining a power ratio of the first signal level to the second signal level; and
 determining that the sensor is aligned when the power ratio of the first signal level to the second signal level is less than a threshold value.

28. The method of claim 24, wherein the step of positioning a first detection object relative to the automobile and coincident with the sensor axis comprises the steps of:
 determining an aligned bore site of one of the plurality of beams; and
 positioning the first detection object relative to the aligned bore site.

29. The method of claim 28, wherein the first beam and the second beam are nonadjacent beams.

30. The method of claim 29, wherein the first beam and the second beam are on opposite sides of a center beam of the plurality of beams.

31. A system for aligning a sensor device attached to an assembly, the sensor device operable to generate a plurality of beams, the system comprising:
 a first positioning fixture operable to place the assembly in a first location; and a second positioning fixture operable to place a first detection object in a second location and relative to the assembly such that the first detection object is positioned at a beam crossing point of a first and second adjacent beam when the sensor device is aligned.

32. The system of claim 31, further comprising:

a third positioning fixture operable to place a second detection object in a third location and relative to the assembly, the third location vertically displaced from the second location.

33. The system of claim 32, wherein the second location is horizontally displaced from an aligned bore site of a center beam of the plurality of beams.

34. The system of claim 33, wherein the second location and the third location are on opposite sides of the aligned bore site of the center beam.

35. The system of claim 31, wherein the first positioning fixture is an automobile alignment fixture.

36. The system of claim 35, wherein the sensor device is a radar antenna array.

37. The system of claim 36, wherein the first detection object is a radar reflector.

38. The system of claim 37, further comprising a radar absorbing material positioned behind the first detection object.

* * * * *